United States Patent Office 2,697,658
Patented Dec. 21, 1954

2,697,658
TREATMENT OF ALKALINE WASTE WATERS

Walter H. MacIntire, Knoxville, Tenn., assignor to The University of Tennessee Research Corporation, Knoxville, Tenn., a corporation of Tennessee No Drawing. Application May 5, 1950,
Serial No. 160,396

4 Claims. (Cl. 71—25)

This invention relates to the clarification of alkaline waste waters resultant from the digestion of pulpwood and other materials in the manufacture of paper and to the concomitant production of useful products.

In the alkaline digestion of cellulosic paper-making materials, the waste liquor remaining after the cellulosic pulp has been separated comprises a hot solution of sodium hydroxide and/or carbonate, discolored by the presence of dissolved and suspended organic matter. In the case of wood pulp, for example, such matter may amount to a substantial portion of the starting wood.

The disposal of such effluent waste waters presents a serious problem. Often the nearby streams are not large enough to admit of their reception of waste waters without resultant detrimental effects upon the fauna of the streams and upon the various uses of stream waters in domestic life and manufacturing operations. Moreover, in many localities discharge of noxious effluents in the streams is forbidden by law. Furthermore, the alkalinity of the effluent waters precludes their disposal through discharges into ponds, because the alkali solutes render the subsoil virtually impervious to gravitational drainage and hence the concentration of the solution is effected only through evaporation. On the other hand, the concentration of the waste water through thermally-induced evaporation, followed by sub-combustion of the effluents to utilize potential fuel values and to recover additive alkali is an expensive procedure.

The present invention provides for neutralization of such waste waters and at the same time for the decolorization and the clarification thereof through removal of suspended matter. These objectives are accomplished in a simple and relatively inexpensive manner, so that disposal problems are diminished and solved while effecting the conservation of a large fraction of the extracted organic matter as products useful for various purposes, as mentioned hereinafter.

The foregoing objectives are accomplished by adding to the waste water calcium chloride and orthophosphoric acid in the proper proportions to effect the neutralization of the alkaline effluent and cause the precipitation of water-insoluble dibasic calcium phosphate, a product of recognized value as a cattle-feed supplement. The quantities of additive calcium chloride and orthophosphoric acid are preferably such that the sodium solutes (sodium hydroxide and sodium carbonate) are neutralized. Because of the extensive surface inherent to the generated precipitate of di-calcium phosphate, the suspended organic matter is occluded, and the waste liquor then can be clarified through separation of the precipitated material in any suitable manner. Ordinarily the resultant clear waters then can be discharged into ponds or streams or disposed of otherwise. The separated precipitate and occluded matter can be dried in any suitable manner, the resultant material being one possessed of fertilizer value of high degree, because of its content of citrate-soluble calcium phosphate and organic matter, as well as being a preferred cattle-feed supplement.

The reactions which take place in the effluent waste water are indicated by the equation, $$H_3PO_4 + CaCl_2 + 2NaOH \rightarrow CaHPO_4 + 2NaCl + 2H_2O$$

The quantities of sodium solutes in the waste water may be known through experience or can be determined quickly through titration, and the quantity of calcium chloride added preferably should be sufficient to combine with all of the PO4 of the H3PO4, since an insufficiency of the calcium ion would result in loss of phosphatic values because of the solubility of sodium phosphates and their continuance in the clarified water.

The preferred quantity of orthophosphoric acid to be used can be computed according to the molar proportions of phosphoric acid and calcium chloride that are indicated in foregoing equation. The use of larger proportions of acid is undesirable and would be wasteful of that reagent. In case smaller quantities of phosphoric acid are used, the phosphatic value of the precipitate is lessened through the formation of the undesirable tribasic calcium phosphate. At the completion of the precipitation, the liquor should be slightly alkaline to assure the full recovery of the PO4 as dibasic calcium phosphate.

In case the phosphoric acid used is virtually devoid of fluorine, as is the phosphoric acid obtained through combustion of elemental phosphorous from the electric furnace reduction of rock phosphate, the precipitate of dicalcium phosphate and occluded organic matter is of particular value for use as a supplement in cattle feeding. When the precipitate is to be used for fertilizer purposes, however, the use of phosphoric acid obtained by the H2SO4 leaching of rock phosphate (the "wet" process) and containing some fluorine, is not objectionable.

The reaction may be carried out immediately after the pulp-digestion process is completed and while the liquor is still hot, or after a period of cooling of the liquor, according to the facilities available at particular plants. In case larger particle size of the engendered dicalcium phosphate is desired, reaction in the hot state is preferable, whereas finer particle size can be produced through slower precipitation in the cold. The calcium chloride and the phosphoric acid can be added separately in either sequence, but it is preferable to add the solid highly soluble chloride first. In some cases, it may be advantageous to add the two reactants to the hot effluent waters simultaneously at a given rate. Any of these procedures, or equivalent procedures, can be used according to the choice of the operator in each case.

The precipitate and occluded material can be separated from the waste liquor in any desired manner, as by the sedimentation and the syphoning off of the clarified supernatant, or more expeditiously by means of either filtration or centrifugation. The separated moist material then can be dried rapidly and inexpensively in any desired manner, preferably at low temperature under reduced pressure.

Reference is made to applicant's copending application Serial No. 160,397, filed May 5, 1950, and entitled "Treatment of Alkaline Waste Waters."

It will be understood that the details of the foregoing description are set forth for purposes of illustration only and that variations therein could be made by those skilled in the art without departure from the spirit of the invention. Therefore reference should be had to the appended claims for a definition of the limits of the invention.

What is claimed is:

1. A process for the treatment of waste waters resultant from digestion of cellulosic paper-making materials and containing alkaline compounds and organic matter, which comprises the addition of calcium chloride and orthophosphoric acid to waste water to form therein dibasic calcium phosphate in the presence of suspended organic matter and to co-precipitate said calcium phosphate and organic matter, and then separating the precipitate and occluded organic matter from the thus clarified waste water.

2. A process as defined in claim 1, wherein the precipitate and occluded matter are recovered jointly and dried.

3. A process as defined in claim 1, the quantities of calcium chloride and orthophosphoric acid added to the waste water being sufficient to effect the near neutralization of the alkalinity of the waste water and co-precipitation of the added Ca and PO4.

4. A process as defined in claim 3, the calcium chloride and orthophosphoric acid being added to the waste water in proportions to effect the formation of dibasic calcium phosphate.

References Cited in the file of this patent

UNITED STATES PATENTS

| Number | Name | Date |
|---|---|---|
| 1,779,226 | Bradley et al. | Oct. 21, 1930 |
| 1,788,952 | Holz | Jan. 13, 1931 |
| 1,933,445 | Murdock | Oct. 31, 1933 |